(12) United States Patent
Iritani et al.

(10) Patent No.: US 6,508,266 B2
(45) Date of Patent: Jan. 21, 2003

(54) DIAPHRAGM VALVE

(75) Inventors: Masao Iritani, Tsuyama (JP); Kaoru Ozawa, Tsuyama (JP); Toru Tateishi, Tsuyama (JP)

(73) Assignee: Toyo Stainless Steel Industries Co., Ltd., Okayama (JP)

( * ) Notice: Subject to any disclaimer, the term of this patent is extended or adjusted under 35 U.S.C. 154(b) by 142 days.

(21) Appl. No.: 09/788,839

(22) Filed: Feb. 20, 2001

(65) Prior Publication Data

US 2001/0025654 A1 Oct. 4, 2001

(30) Foreign Application Priority Data

Mar. 31, 2000 (JP) ........................................ 2000-096332
May 10, 2000 (JP) ........................................ 2000-137064

(51) Int. Cl.⁷ .............................. F16K 7/16; G01M 3/18
(52) U.S. Cl. ................. 137/312; 137/15.11; 73/40.5 R; 251/331; 340/605
(58) Field of Search ............................... 137/15.11, 312; 73/40.5 R; 251/61.1, 61.2, 331; 340/605, 620; 702/51

(56) References Cited

U.S. PATENT DOCUMENTS 3,154,286 A * 10/1964 McFarland, Jr. ............ 251/331
3,631,882 A * 1/1972 White, Jr. .................... 137/312
4,901,751 A * 2/1990 Story et al. .................. 137/312
5,214,387 A * 5/1993 Fenner ........................ 324/557
5,261,442 A * 11/1993 Kingsford et al. .......... 137/312
5,316,035 A * 5/1994 Collins et al. ............... 137/312
5,517,181 A * 5/1996 Gray et al. .................. 204/416
6,102,071 A * 8/2000 Walton et al. .............. 137/540
6,175,310 B1 * 1/2001 Gott ............................ 340/604

* cited by examiner

*Primary Examiner*—Michael Powell Buiz
*Assistant Examiner*—Ramesh Krishnamurthy
(74) *Attorney, Agent, or Firm*—Schweitzer Cornman Gross & Bondell LLP

(57) ABSTRACT

A diaphragm valve can properly mount a peripheral portion of a diaphragm over the entire periphery and reliably establish a seal between the peripheral edge portion on a liquid side of the diaphragm and a diaphragm mounting seat for preventing leakage of a liquid. The diaphragm valve includes an annular base (27) provided to project from a seat surface of mounting seat (12) for a predetermined height and connected with a bracket mounting flange (16) on the side of valve operating portion by bolts (17). A diaphragm retaining portion (30) is formed integrally with flange (16) for compressing the peripheral edge portion of diaphragm with a constant pressure so that flange (16) and base (27) are connected by bolts (17) in the condition where diaphragm (14) is compressed onto base (12) with constant pressure by diaphragm retaining portion (30).

11 Claims, 8 Drawing Sheets

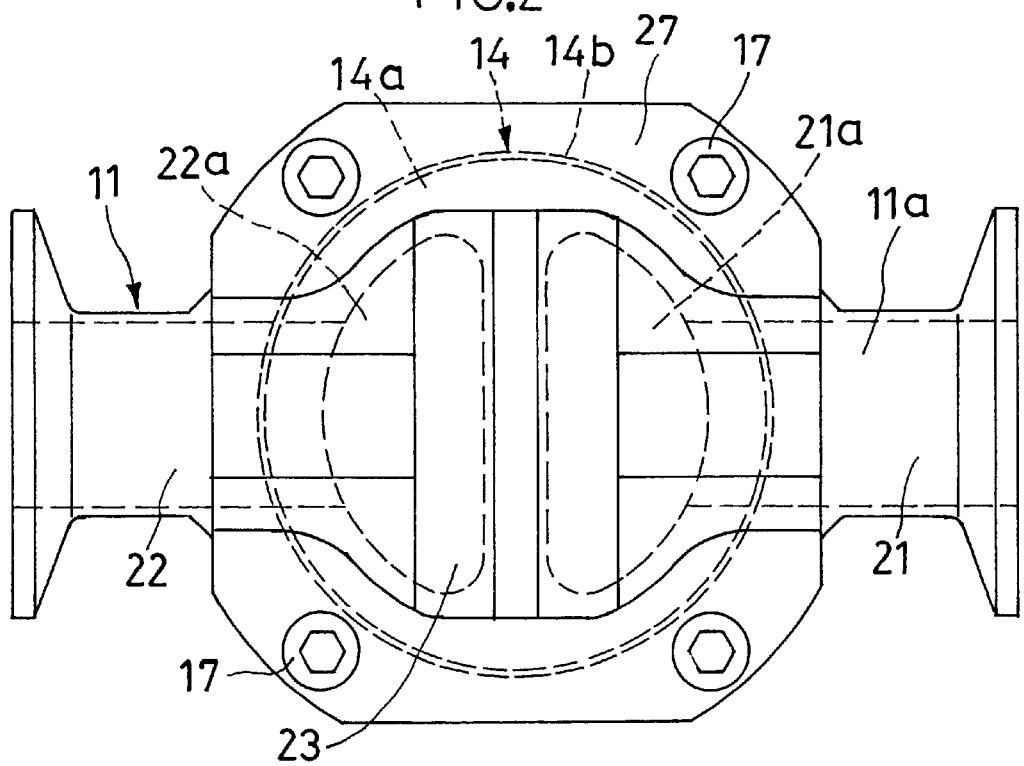
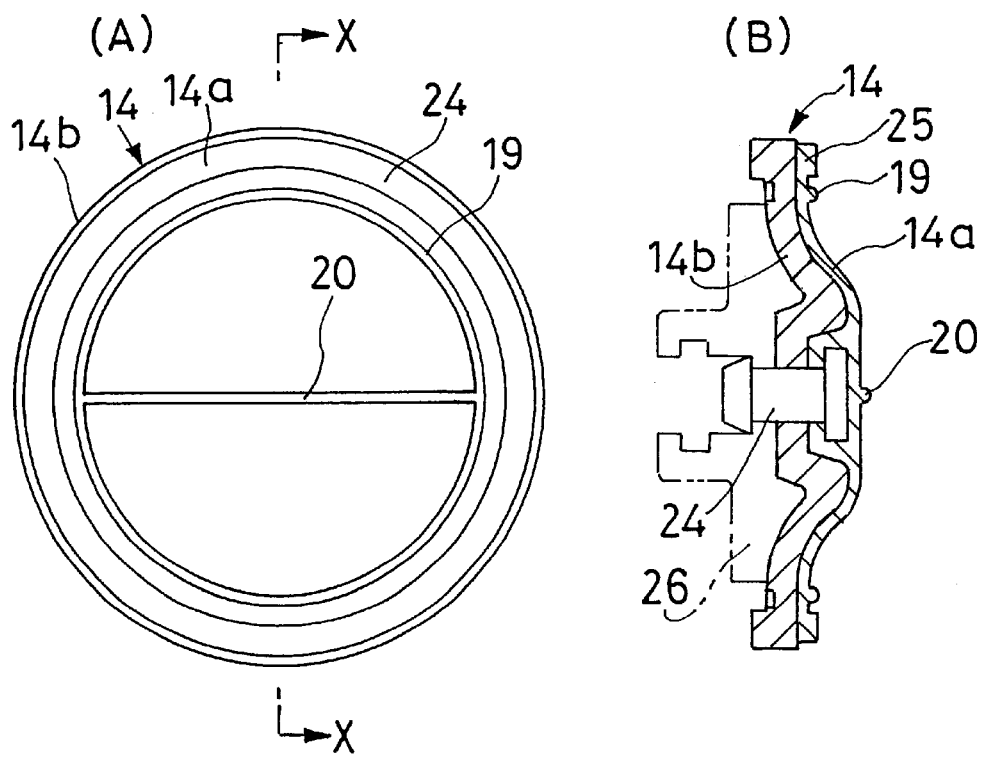

PRIOR ART

DIAPHRAGM VALVE

BACKGROUND OF THE INVENTION

1. Field of the Invention

The present invention relates to a diaphragm valve to be used for opening and closing a flow path of a fluid piping, such as various liquid piping in food industry, pharmaceutical industry and so forth.

2. Description of the Related Art

FIG. 8 shows the conventional diaphragm valve. The diaphragm valve is constructed by fixing a peripheral edge portion on a side of a diaphragm 4 arranged in opposition to a valve seat 3 which is arranged within a valve body 1, on an annular diaphragm mounting seat 2 provided on a side wall portion 1a of the valve body, for opening and closing a flow path by moving the diaphragm 4 toward and away from the valve seat 3 by driving in forward and reverse direction an actuation shaft of a valve operating portion 5 connected to a central position on a back surface side of the diaphragm 4. The valve operating portion 5 is formed with an air cylinder. A piston rod of the air cylinder serves as the actuation shaft. The air cylinder is mounted on the valve body 1 via a bracket 8.

As shown in FIG. 8, in the conventional diaphragm valve, the peripheral edge portion of the diaphragm 4 is fixed to the diaphragm mounting seat 2 by clamping the peripheral edge portion of the diaphragm between the diaphragm mounting seat 2 and a bracket mounting flange 6 of the valve operating portion 5 and by tightening four bolts 7 through the flange 6, the peripheral portion of the diaphragm 4 and the mounting seat 2. If tightening force of the bolts 7 is small, the force compressing the peripheral portion of the diaphragm onto the mounting seat is insufficient to prevent leakage of liquid. If the tightening force of the bolts 7 is too large, the force compressing the peripheral edge of the diaphragm locally becomes large in the portion around the bolts 7, forming gaps between the diaphragm 4 and the mounting seat 2, between adjacent bolts 7, to cause leakage of the liquid. Therefore, adjustment of tightening force is difficult. Furthermore, there is sufficient personal error in the tightening operation to cause significant difficulty in properly fixing the peripheral portion of the diaphragm 4 onto the diaphragm mounting seat 2.

On the other hand, as shown in FIG. 9, the diaphragm 4 is formed with a surface membrane 4a of about 1 mm thick made of fluorine containing resin having superior chemical resistance, high water resistance and surface slip characteristics, such as Teflon (polytetrafluoroethylene: Registered Trademark of Du Pont). The back surface of the membrane 4b is made of rubber and supports the surface membrane 4a. The rubber back surface membrane 4b causes little thermal expansion and contraction in response to temperature variation. On the other hand, the surface membrane 4a of fluorine containing resin, such as Teflon, has a property to expand up to a certain temperature and to cause shrinking at higher temperature. Therefore, sufficient shrinking margin W is provided for a peripheral edge portion of the surface membrane 4a to be mounted on the mounting seat 2 of the valve body 1.

As shown in FIG. 10, an annular ridge 9 is formed along the peripheral edge portion of the surface membrane 4a for enhancing the sealing effect with the diaphragm mounting seat 2 and the valve seat 3. Also, a linear ridge 10 extends diametrically in relation to the annular ridge 9 for the valve seat. The distance between the annular ridge 9 and an inner end edge of the diaphragm mounting seat 2 is the shrinking margin W. Thus, as can be appreciated from FIG. 9, if the shrinking margin W is wide, a gap S formed between the liquid contacting surface of the membrane 4a and the diaphragm mounting seat 2 becomes deep, increasing tendency of penetration and trapping of the liquid therein to cause difficulty of washing. When the liquid is a food, such as milk, it becomes quite insanitary. It should be noted that, in FIG. 10, the reference numerals 4c designate bolt insertion holes provided at four corners of the diaphragm 4.

SUMMARY OF THE INVENTION

The present invention has been worked out in view of the problems set forth above. It is an object of the present invention to provide a diaphragm valve which can properly mount the peripheral portion of a diaphragm over the entire periphery and establish with certainty a seal between the peripheral portion of the diaphragm and a diaphragm mounting seat, for effectively preventing leakage of a liquid.

Pursuant to one aspect of the invention, a diaphragm type liquid control valve is provided with an improved means for securing and sealing the diaphragm. This includes an annular diaphragm mounting seat on the main valve body, in combination with an annular projection extending from a bracket mounted on the opposite side of the diaphragm from the mounting seat. The bracket and valve body are secured together and positioned by mating surfaces on the valve body and the bracket which position the annular projection a known distance from the diaphragm mounting seat. Proper positioning of the bracket is assured by the before mentioned mating surfaces, to reliably secure and seal the diaphragm in the valve structure. The diaphragm is thus not penetrated by bolts, providing a superior seal which is not affected by personal error of the valve assembly personnel. Additionally, the diaphragm, which may include costly materials, may be of circular form, requiring less material in its production.

According to another aspect of the invention, the diaphragm element, which may have a liquid-side membrane formed of a fluorine containing resin (e.g., Teflon) is formed with an annular peripheral projection received within an annular recess surrounding the diaphragm mounting seat. This arrangement significantly limits the shrinkage effect on the fluorine containing membrane, when the diaphragm is exposed to heated liquid. Additionally, the liquid side of the membrane may be provided with an annular ridge, positioned to engage the diaphragm mounting seat to provide reliable sealing contact. The arrangement of the annular projection on the diaphragm and the receiving recess surrounding the diaphragm mounting seat enables the annular projection to be positioned more closely than otherwise to the inner edge of the diaphragm seat, minimizing the space for stale liquid to collect in that region and facilitating the clean out of the valve when necessary. This is particularly advantageous for valves used in food processing systems or the like, where sanitation is an important factor.

According to a further aspect of the invention, the valve structure, on the back side of the diaphragm, is provided with a leak-sensing element, to quickly detect any failure in the diaphragm. The sensor includes a generally sealed sensor casing exposed to the inside of the valve, behind the diaphragm, and provided with an exposed infiltration membrane, which permits liquid to infiltrate from outside to inside of the casing, but preferably not in the other direction. Within the casing, there is a strong electrolyte associated with a pair of spaced-apart electrodes. When the electrolyte is contacted by liquid infiltrating the membrane, a current can flow between the electrodes to operate an alarm. This provides for reliable leak detection, even when the valve is functioning with relatively nonconductive liquids, such as highly pure water.

Preferably, the diaphragm may be comprised of a liquid-contacting membrane of fluorine containing resin and a support membrane of rubber laminated on back surface of the liquid-contacting membrane. The support membrane is provided with leakage indicating conduit which enables leaking liquid to quickly come into contact with the sensor element.

Other objects and advantages of the invention will become more clear from the discussion given hereinafter.

The present invention will be understood more fully from the detailed description given hereinafter with reference to the accompanying drawings of preferred embodiments of the present invention, which, however, should not be taken to be limitative to the present invention, but are for explanation and understanding only.

DESCRIPTION OF THE DRAWINGS

FIG. 2 is a bottom view of the diaphragm valve of FIG. 1;

FIG. 3A is a plan view of the diaphragm;

FIG. 3B is a section taken along line X—X of FIG. 3A;

DESCRIPTION OF THE PREFERRED EMBODIMENT

Figure 1:
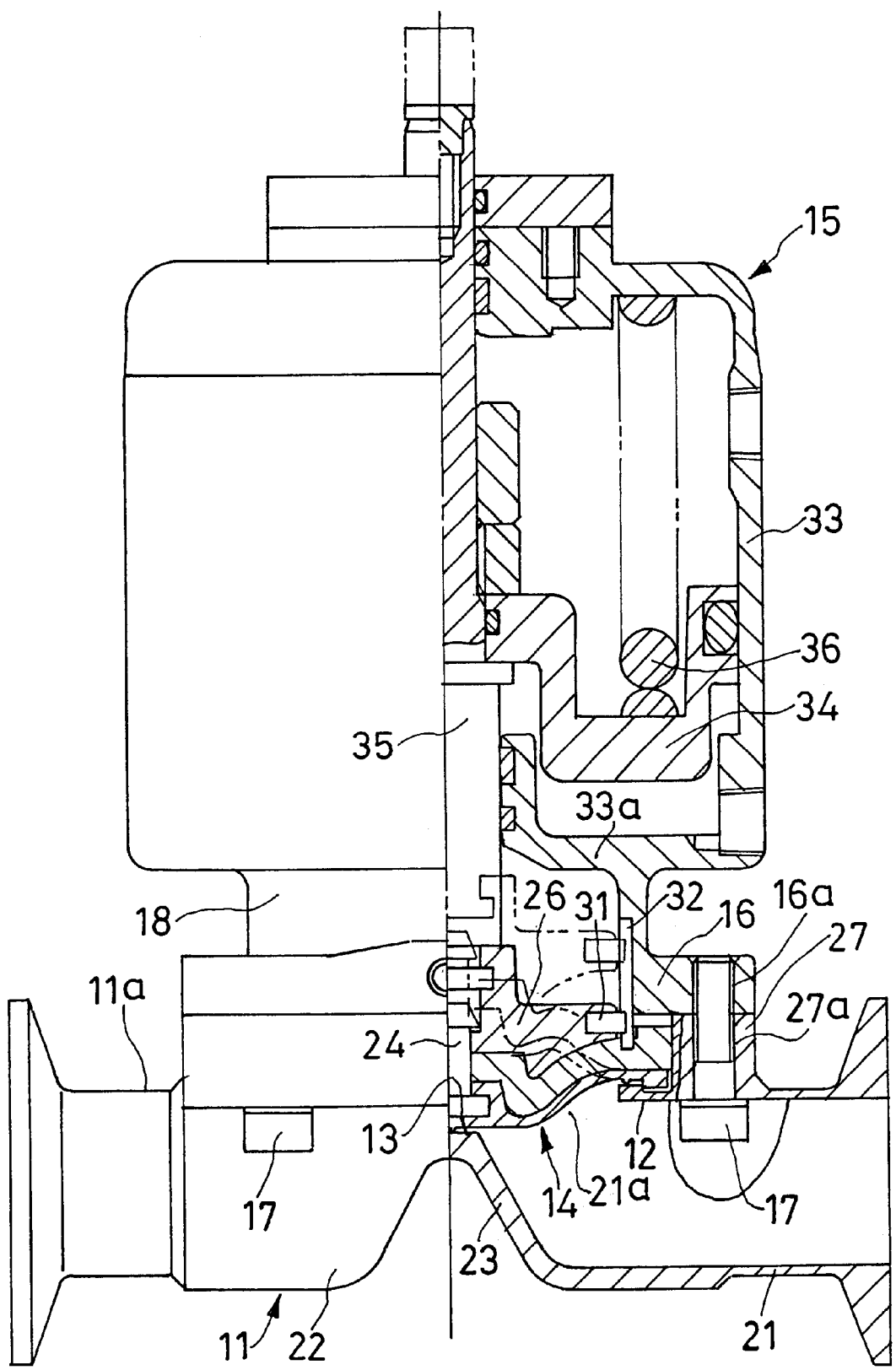
FIG. 1 is a longitudinally half sectioned front elevation of the preferred embodiment of a diaphragm valve according to the present invention.

FIG. 1 is a longitudinally half sectioned front elevation of a preferred embodiment of the diaphragm valve according to the present invention, and FIG. 2 is a bottom view thereof. In FIGS. 1 and 2, the reference numeral 11 denotes a cylindrical valve body. At a central portion in the longitudinal direction of the valve body 11, an inwardly projecting dam portion 23 forming a valve seat 13 is provided. The reference numeral 12 denotes a diaphragm mounting seat for mounting the peripheral edge portion of a diaphragm 14. The diaphragm mounting seat 12 is formed on a side wall portion 11a of the valve body 11. On the inside of the diaphragm mounting seat 12, valve openings 21a and 22a communicate with inlet and outlet pipe portions 21 and 22 formed on opposite sides of the dam portion 23.

The diaphragm 14 is comprised of a membrane 14a formed of fluorine containing resin and a support membrane 14b formed of rubber stacked on a back surface of the membrane 14a. Both membranes 14a and 14b are connected to a connecting shaft 24 mounted in the central portion thereof. As shown in FIG. 3, the membrane 14a is formed into a disc shaped configuration of about 1 mm thick of Teflon as the fluorine containing resin. On the peripheral edge portion of the membrane 14a, an annular ridge portion 25 of quadrangular cross section is projected. Adjacent the inner periphery of the annular ridge portion 25, an annular projection 19 is projected. Also, a linear projection 20, is formed to diametrically connect the annular projection 19. The support membrane 14b is formed of a synthetic resin resistant to temperature variation, into a disc shaped configuration with about 4 mm thick and a slightly greater diameter than that of the liquid contacting membrane 14a. A metallic retainer 26 is arranged on the back surface of the support membrane 14b. The retainer 26, the support membrane 14b and the liquid contacting membrane 14a are integrally connected via the connecting shaft 24 so as not to permit relative angular displacement with respect to each other.

Figure 4:
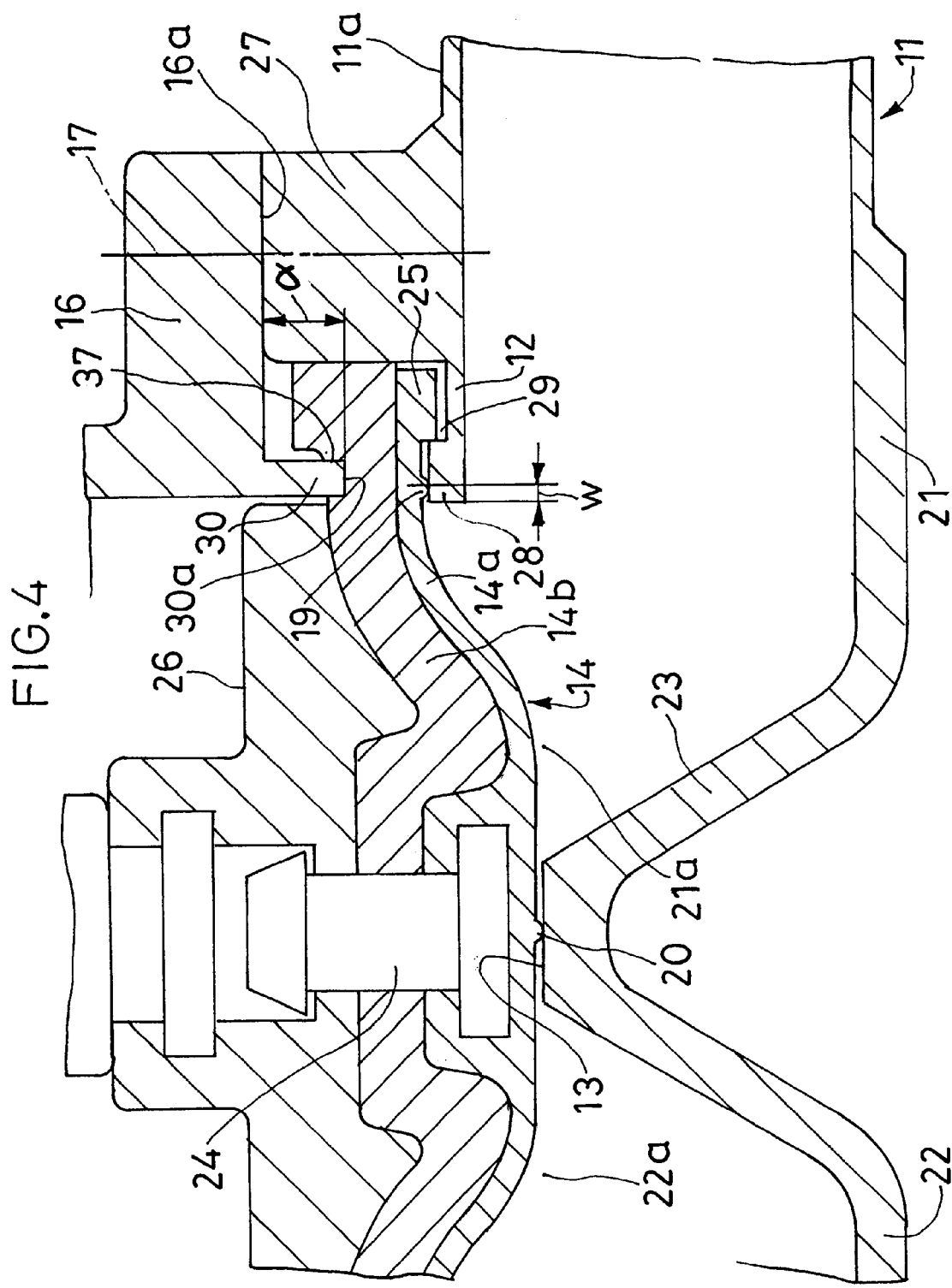
FIG. 4 is an enlarged partial section of the diaphragm valve shown in FIG. 1.

As shown in FIGS. 1 and 4, on the outer periphery side of the diaphragm mounting seat 12, an annular base 27 is connected with a bracket mounting flange 16, joined with an operating device 15 by means bolts. The base 27 is projected upward at a predetermined height. On the other hand, adjacent the inner periphery of the annular base 27, an annular projection 28 extends upwardly to define an annular groove 29 in cooperation with the annular base 27. In this case, a seating surface of the diaphragm mounting surface 12 is substantially the upper surface of the annular projection 28.

On the other hand, on the bracket mounting flange 16, an annular diaphragm retaining portion 30 is projected downward from the inner peripheral portion thereof. A retaining surface 30a at the lower end of the diaphragm retaining portion 30 is projected downwardly from an abutting surface 16a of the bracket mounting flange 16 for a length α, as shown in FIG. 4. The downwardly projecting annular body, formed by the diaphragm retaining portion 30 of the flange 16, enables the peripheral portion of the diaphragm 14 to be effectively compressed. The projecting length a of the diaphragm retaining portion 30 is set in a length to compress the peripheral portion of the diaphragm 14 to firmly press the annular projection 19 onto the annular projection 28 with a constant pressure, in the condition where the peripheral portion of the diaphragm 14 having a predetermined thickness is sealingly engaged with the diaphragm mounting seat 12 as shown. In setting the projecting length a of the diaphragm retaining portion 30, the projecting height of the annular projection 28 from the diaphragm mounting seat 12, the thickness of the diaphragm 14, and the elastic modulus of the diaphragm 14 are taken into account.

A vertical engaging groove 32 is formed in the diaphragm retaining portion 30 for receiving an anti-rotation pin 31 projected from the retainer 26. The anti-rotation pin 31 serves not only for preventing the diaphragm 14 from rotating but also as positioning means for properly positioning the linear projection 20 projecting from the bottom surface of the membrane 14a forward the valve seat 13. On the other hand, in the bracket mounting flange 16 and the annular base 27 on the side of the valve body 11, bolt holes 16a and 27a are formed at four portions, respectively. The diaphragm retaining portion 30 may be provided in a form detachable from the bracket mounting flange 16.

As shown in FIG. 1, the valve operating portion 15 is formed with an air cylinder connected to a bracket 18 formed with the flange 16 at the lower end. The cylinder 15 is constructed with a cylinder body 33, a piston 34 and a piston rod 35 reciprocating in an axial direction integrally with the piston 34. The piston rod 35 serves as the actuation shaft of the diaphragm valve. The lower end of the piston rod 35 is connected to the retainer 26 so that the position of the diaphragm 14 can be varied between a valve closing position, where the diaphragm 14 is in contact with the valve seat 13 as shown by the solid line of FIG. 1, and a valve open position where the diaphragm 14 is spaced away from the valve seat 13 as shown by phantom line in FIG. 1. As shown in FIG. 1, part of the bracket 18 forms a lower end wall portion 33a of the cylinder body 33. In FIG. 1, the reference numeral 36 denotes a coil spring normally biasing the piston toward a valve closing direction.

Next, discussion will be given for a method for mounting and securing the diaphragm 14 onto the diaphragm mounting seat 12 of the valve body 11. At first, in the condition where the bracket 18 is removed from the valve body 11, the diaphragm 14 is fitted onto the diaphragm mounting seat 12 surrounded about its outer periphery by the annular base 27. The annular ridge portion 25 is fitted into the groove 29 formed along the outer side of the annular projection 28 on the mounting seat 12, to cause the annular projection 19 to contact the annular projection 28 of the mounting seat 12, and to abut the linear projection 20 onto the valve seat 13. From this condition, with mounting the flange 16 of the bracket 18 positioned on the annular base 27, the lower end portion of the diaphragm retaining portion 30 is pushed into an annular groove 37 formed on the back side of the support membrane 14b. Then, bolts 17 are threaded into the threaded holes 16a of the flange 16 from the threaded holes 27a of the annular base 27, to connect the flange 16 with the annular base 27.

Thus, by fastening the flange 16 onto the annular base 27 by four bolts 17, the diaphragm retaining portion 30 compresses the peripheral portion of the diaphragm 14 over the entire periphery to depress the annular projection 19 of the liquid contacting membrane 14a onto the annular projection 28 of the diaphragm mounting seat 12. This establishes a complete and effective seal between the membrane 14a and the annular projection 28 of the mounting seat 12. At this time, pressure applied to the peripheral portion of the diaphragm 14 by the diaphragm retaining portion 30 is constant as set by the projecting height of the annular projection 19, the thickness of the diaphragm 14 and the elastic modulus of the diaphragm 14. Therefore, what is required is simply to tighten the bolts 17 to fasten the flange 16 onto the annular base 27. Accordingly, over-tightening or under-tightening of the bolts 17 will never be caused. Also, irrespective of the person who tightens the bolt, no personal error in the tightening operation will prevent accurately fixing the peripheral edge portion of the diaphragm 14 over the entire periphery of the diaphragm seat 12 to assure prevention of liquid leakage.

On the other hand, with the mounting structure of the diaphragm 14 set forth above, the liquid contacting membrane 14a of the diaphragm has the annular ridge portion 25 projected along the peripheral edge portion and the annular projection 19 extending circumferentially inwardly on the annular ridge portion 25. The annular ridge portion 25 on the membrane 14a is engaged with the annular groove 29 formed on the outer circumference of the annular projection 28 to abut the annular projection 19 of the membrane 14a onto the annular projection 28 of the diaphragm mounting seat 12. Therefore, even if the membrane 14a formed of fluorine contained resin, such as Teflon or the like, is caused to shrink by the high temperature liquid flowing through the flow path, the annular ridge portion 25 of the membrane 14a received in the annular groove 29 formed on the outer circumference of the mounting seat 28 restricts shrinking of the membrane 14a. Accordingly, as shown in FIG. 4, the annular projection 19 of the membrane 14a can be arranged in the vicinity of the inner peripheral edge of the diaphragm mounting seat 12 as close as possible. Thus, a shrinking margin w as a gap between the annular projection 19 and the mounting seat 12 can be set as narrow as possible.

Since the shrinking margin w is quite narrow as possible, a gap may not be formed between the surface of the membrane 14a and the diaphragm mounting seat. Even when the gap is formed, the gap is shallow to minimize accumulation of liquid and to facilitate cleaning, and is quite sanitary. Additionally, since the peripheral edge portion of the diaphragm 14 is not bolted by providing the bolt holes as in the prior art, in order to mount the diaphragm 14 on the diaphragm mounting seat 12, the diaphragm 14 can be formed into circular shape to permit saving of the material.

Figure 5:
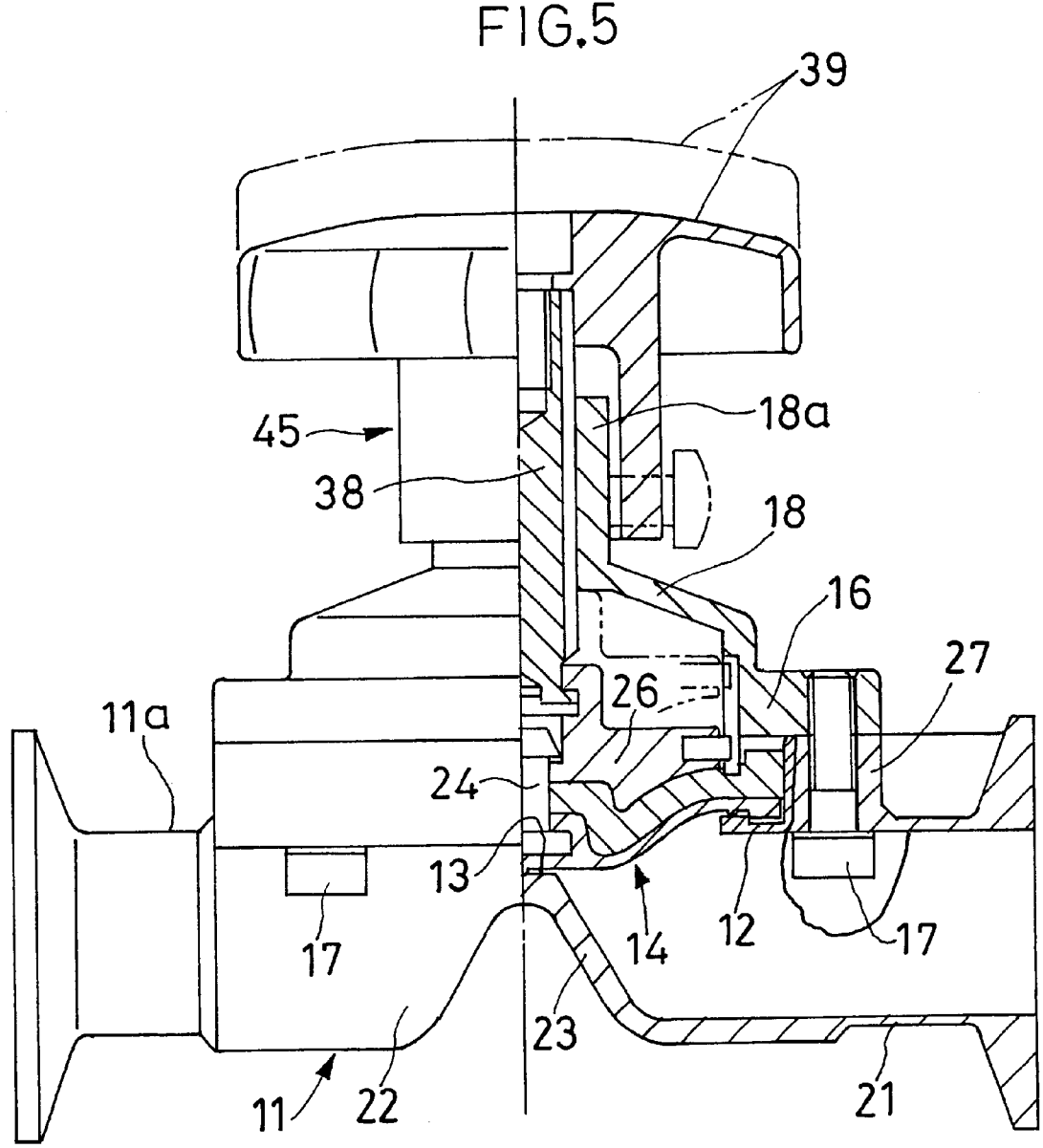
FIG. 5 is a longitudinally half sectioned front elevation of a second form of diaphragm valve, having a manually operable valve operating portion.

FIG. 5 shows a diaphragm valve having a manually operable valve operating portion 45. In the construction of the valve operating portion 45, like components to those of the diaphragm valve shown in FIGS. 1 to 4 will be identified by like reference numerals and redundant discussion for such common component will be omitted in order to keep the disclosure simple enough to facilitate clear understanding of the present invention. The valve operating portion 45 is constructed with a cylindrical threaded portion 18a at the upper end portion of the bracket 18 mounted on the side of the valve body 11, a threaded shaft 38 to mesh with the cylindrical threaded portion 18a and a handle 39 to be operated manually for rotating the threaded shaft 38. The threaded shaft 38 serves as the actuation shaft. Accordingly, by manually rotating the threaded shaft, the shaft is shifted axially to vary the mode of the diaphragm between the valve closing mode abutting onto the valve seat 13 and the valve opening mode released away from the valve seat 13.

With the preferred embodiment of the diaphragm valve according to the present invention set forth above, by tightening the bolts 17 to fasten the bracket mounting flange onto the annular base of the valve body, the diaphragm retaining portion uniformly compresses the entire circumference of the peripheral edge portion of the diaphragm to press the peripheral edge portion onto the diaphragm mounting seat. Thus, a complete seal can be established between the peripheral edge portion on the lower surface of the diaphragm and the diaphragm mounting seat. At this time, the pressure to be exerted on the peripheral edge portion of the diaphragm through the diaphragm retaining portion can be a constant pressure preliminarily set in consideration of the projecting height of the annular projection from the diaphragm mounting seat, the thickness of the diaphragm and the elastic modulus of the diaphragm. Therefore, it is only required to fasten the flange onto the annular base by tightening the bolts so as not to cause over tightening or lack of tightening, and not to compensate for personal error in tightening operation. Thus, the peripheral edge portion of the diaphragm can be properly fixed on the diaphragm mounting seat over the entire circumference to reliably prevent liquid leakage.

On the other hand, with the diaphragm valve according to the present invention, the diaphragm is provided with the annular ridge portion extending along the peripheral edge portion and the annular projection extending circumferentially at the inner side of the annular ridge portion, and the diaphragm mounting seat is provided with the annular projection. In the annular groove defined on the outer circumference of the annular projection, the annular projection 25 of the diaphragm is engaged to abut the annular ridge portion 19 of the diaphragm onto the annular projection 28 of the diaphragm mounting seat. Therefore, even if the membrane 14a formed of fluorine containing resin, such as Teflon or the like, which causes shrinking by the high temperature liquid flowing through the flow path, the annular ridge portion of the membrane is restricted by the annular groove formed on the outer circumference of the mounting seat to minimize shrinking of the membrane. Accordingly, the annular projection 19 of the membrane can be positioned as close as possible to the inner peripheral edge of the diaphragm mounting seat. Thus, a shrinking margin as a gap between the annular projection of the membrane 14a and the mounting seat can be set as narrow as possible. Since the shrinking margin is quite narrow, any gap formed between the surface of the membrane 14a and the diaphragm mounting seat is shallow to accumulate only a minimal amount of liquid and to facilitate cleaning, and is thus quite sanitary.

As shown in the embodiment of the present invention, the retaining surface of the diaphragm retaining portion 30 can effectively compress the peripheral edge portion of the diaphragm since the diaphragm retaining portion is placed at the position projected for a predetermined length from the abutting surface of the bracket mounting flange abutting onto the annular base.

In the illustrated embodiments of the present invention, since the diaphragm can be formed into circular shape, material can be reduced to achieve material saving.

When the valve operating portion is formed with the cylinder connected with the bracket mounted on the side of the valve body, driving of the actuation shaft back and forth in an axial direction can be done automatically. Also, when the valve operating portion is formed with the threaded shaft threadingly engaged with the bracket mounted on the side of the valve body, and the handle rotatingly operating the threaded shaft, back and forth driving of the actuation shaft in the axial direction can be simply and easily operated manually.

Figure 6:
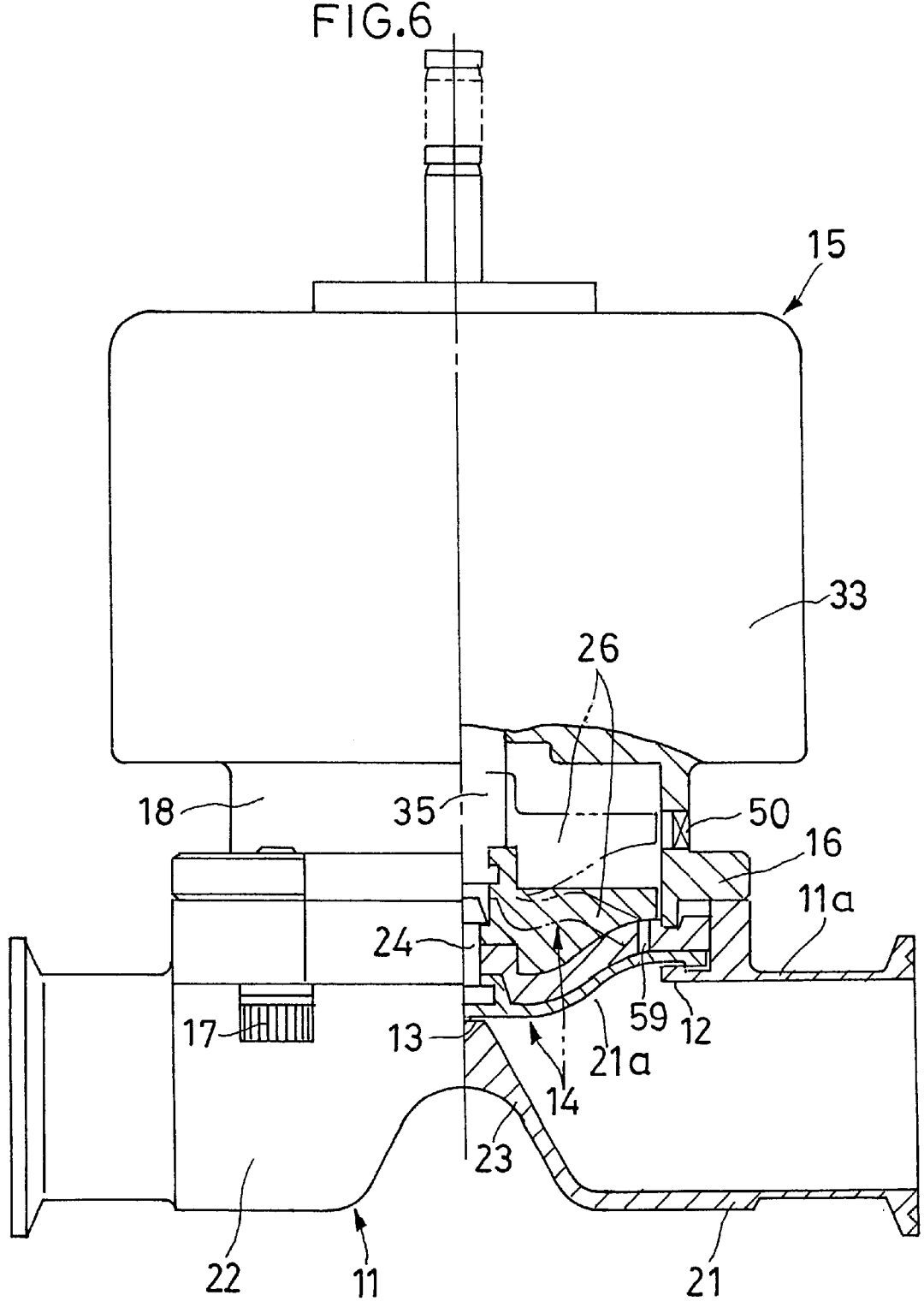
FIG. 6 is a half sectioned front elevation of another embodiment of a diaphragm valve with a leakage detection sensor according to the present invention.
Figure 7:
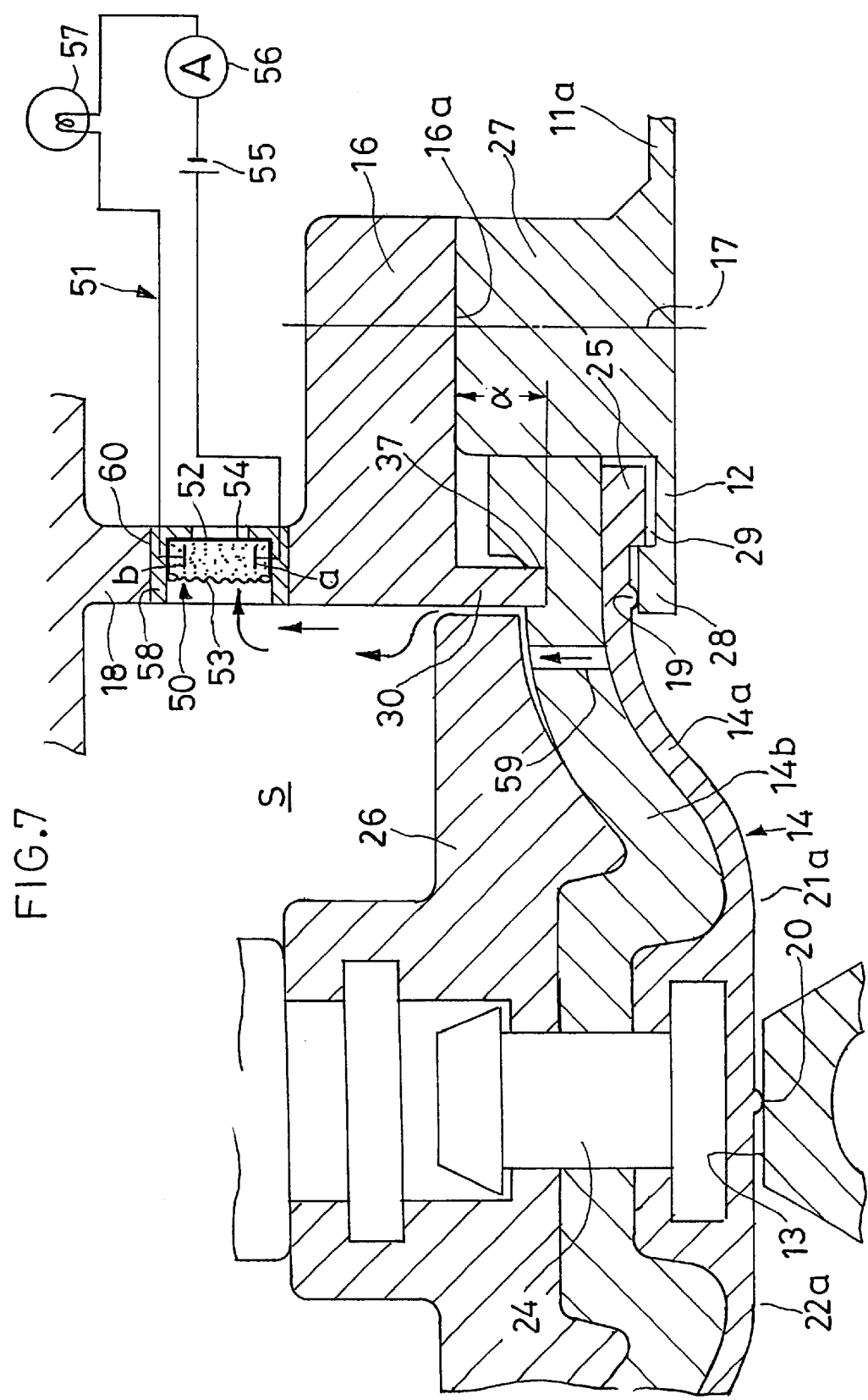
FIG. 7 is an enlarged partial section of the diaphragm valve shown in FIG. 6.
Figure 8:
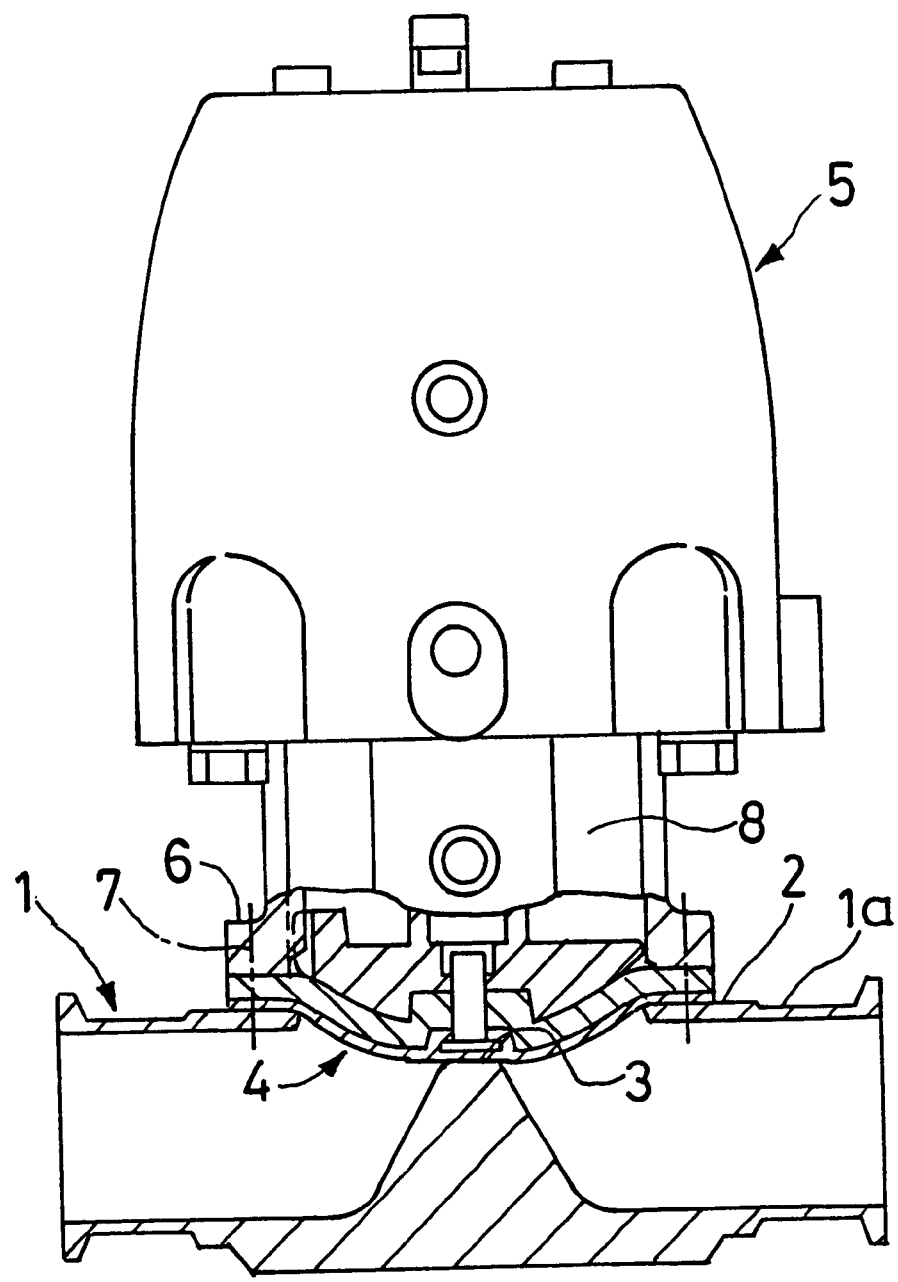
FIG. 8 is an enlarged partially sectioned front elevation of a conventional diaphragm valve.
Figure 9:
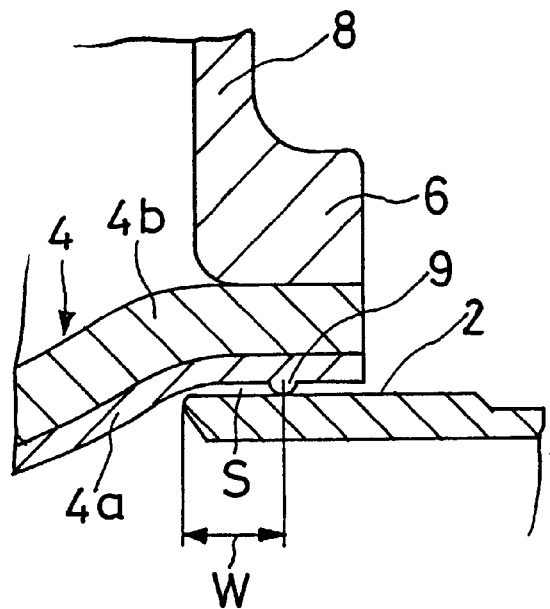
FIG. 9 is an enlarged partial view of the conventional diaphragm valve shown in FIG. 8.
Figure 10:
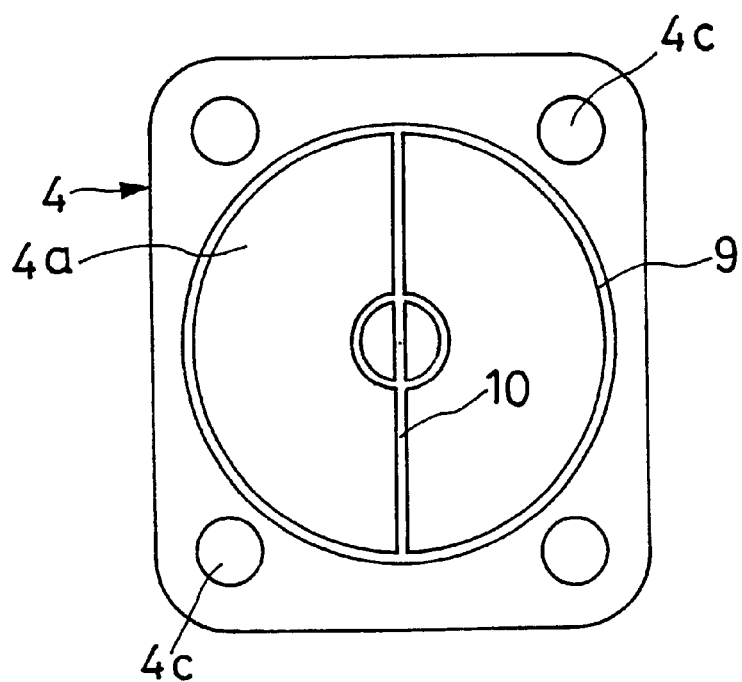
FIG. 10 is a plan view of the conventional valve diaphragm.

FIGS. 6 and 7 show another embodiment of the diaphragm valve according to the present invention, in which a liquid leakage detection sensor is provided in the diaphragm valve. Namely, in the conventional diaphragm valve, the diaphragm forming the valve body is mounted at a position opposing to the valve seat in the valve body in a manner isolating the side contacting with the liquid and the back surface side. By back and forth driving of the actuation shaft connected to the central portion, the diaphragm is moved toward and away from the valve seat to open and close the flow passage. Thus, in such diaphragm valve, the diaphragm may seal the liquid side, the back side is engaged by the actuation mechanism. The peripheral edge portion is sealed, so that constant contact with the liquid occurs only on the liquid side of the diaphragm. Also, valve operation can be performed by deformation of the diaphragm so as not to require any sliding contact, such as by a valve shaft portion as in various other valves, which easily cause leakage of the liquid. Thus, for high sealing ability in the valve portion, it is particularly useful for the field of food industry, pharmaceutical industry and so forth which requires high reliability in safety and sanitation.

When breakage occurs in the diaphragm of a valve employed in a manufacturing line of the liquid, for example in a pure water line or the like, it becomes necessary to have a function for detecting the breakage in order to avoid continuous production of defective liquid. Conventionally, it has been a common practice to regularly replace the diaphragm at earlier timing before the occurrence of breakage, but this is not economical.

It has been known to provide an electrical sensor, in which a conductive rubber layer is provided in the diaphragm for electrically detecting liquid leakage. In case of a pure water line in the pharmaceutical industry, or the like, because of quite low conductivity of the pure water, liquid leakage cannot be detected accurately and such a sensor is not very practical.

The embodiment shown in FIGS. 6 and 7, in view of the problem set forth above, even in the case of the liquid having quite low conductivity, such as the pure water, it becomes possible to provide the liquid leakage detection sensor of the diaphragm which can be certain detect liquid leakage.

In the following discussion, like components to those of the previously described embodiments will be identified by like reference numerals and redundant discussion for such common component will be omitted. As shown in FIGS. 6 and 7, the liquid leakage sensor assembly includes a sensor body 50 inserted within an opening 60 provided at a predetermined position in the bracket 18, and a detection circuit 51 formed outside of the bracket 18 from the sensor body 50. Also, in the back side membrane 14b serving as the back-up membrane of the diaphragm, a leakage indicating conduit 59 is formed.

As shown in FIG. 7, the sensor body 50 is constructed with a sealed casing 54 formed with a box-shaped casing body 52 open on one side, and an infiltration membrane 53 arranged in the open side of the casing body 52. A strong electrolyte is contained in the sealed casing 54, and a pair of electrodes a and b respectively serve as anode and cathode arranged in opposition. The infiltration membrane 53 is a membrane arranged in the open side of he casing body 52 so as to permit penetration of liquid from outside of the sealed casing 54 into the inside while preventing leakage of the liquid within the casing 54 to the outside.

The strong electrolyte received within the sealed casing 54 of the sensor body 50 may be NaCl (sodium chloride to be used as a salt or the like) in the preferred embodiment. However, other material, such as NaOH (caustic soda, sodium hydroxide and the like) may also be used. As shown in FIG. 7, the 12 detection circuit 51 is an electric circuit including the electrodes a and b arranged within the sealed casing 54, a power source 55 which is formed with a battery, an ammeter 56 and a lamp 57.

Upon mounting of the sensor body 50 onto the opening 60 of the bracket 18, the casing body 52 is mounted and fixed via a sealing member 58 in the condition where the infiltration membrane 53 is located at a position contacting with liquid leaking to the back side of the diaphragm 14.

In the liquid leakage detection sensor constructed as set forth above, assuming that the shown diaphragm valve is disposed within the pure water line, if the membrane 14a leaks, the water (pure water) leaking to the back surface side through the broken portion of the membrane 14a penetrates into a gap between the back surface of the membrane 14a and the front surface of the back membrane 14b. Then, the leaking liquid flows into the inside of the bracket 18, namely, into the space "S", through the leakage indicating conduit 59 of the membrane 14b. The leaked water accumulated in the space S passes through the infiltration membrane 53 and then is mixed with NaCl within the sealed casing 54. Once the leaking water is admixed with NaCl, NaCl is dissociated into Na ion (+) and Cl ion (−), namely electrolytically dissociated, for high dielectric constant of the water.

Furthermore, since NaCl is a strong electrolyte, it is completely dissociated in the water (no molecule which is not dissociated will be remained).

When electrolytic dissociation of NaCl is caused in the leaked water penetrated into the sealed casing 54 of the sensor body 50, as set forth above, the dielectric constant of the water is increased to establish conductive state between the electrodes a and b. A conductive state between the electrodes a and b can be detected by turning ON of the lamp 57. Also, a degree of conduction can be seen from an indication of the ammeter 56. Accordingly, occurrence of breakage of the membrane 14a of the diaphragm 14 can be detected quickly by the liquid leakage detection sensor.

When a diaphragm valve is equipped with the liquid leakage detection sensor described herein, even in case of the liquid having quite low conductivity, such as pure water, leakage from the membrane 14a can be reliably detected. The diaphragm 14 consists of the thin membrane 14a of fluorine containing resin and the thick back-up membrane 14b of rubber stacked on the back side. By providing the liquid leakage indicating conduit 59 in the back-up membrane 14b, water leaking through the broken portion of the membrane 14a immediately flows out to the back of the diaphragm 14 through the liquid leakage indicating conduit 59 to contact with the sensor body 50. Therefore, breakage of the surface side membrane 14a can be detected quickly.

While discussion has been given for detection of leakage of pure water in the pure water line, the liquid leakage sensor can detect not only the pure water but also leakage of liquids other than pure water.

In the diaphragm valve shown in FIGS. 6 and 7, upon breakage of the diaphragm, the liquid leaking out the back side is admixed with the strong electrolyte within the casing through the infiltration membrane of the sensor body. This causes electrolytic dissociation of the strong electrolyte to increase electric conductivity of the liquid, resulting in a conductive state of between the electrodes within the casing to enable detection of breakage of the diaphragm. Accordingly, the diaphragm can be used for an extended period throughout its useful life.

Although the present invention has been illustrated and described with respect to exemplary embodiments thereof, it should be understood by those skilled in the art that the foregoing and various changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A diaphragm valve with elements fixing a peripheral edge portion on a liquid side of a diaphragm arranged in opposition to a valve seat within a valve body, on an annular diaphragm mounting seat provided in a predetermined portion of said valve body, and driving an actuation shaft of a valve operating portion connected to a central portion on a back surface of said diaphragm back and forth in an axial direction to abutting and releasing positions of the liquid side of the diaphragm with respect to said valve seat for opening and closing a flow passage, comprising:

an annular base provided to project from a seat surface of said mounting seat for a predetermined height and connected with a bracket mounting flange on the side of said valve operating portion by bolts; and a diaphragm retaining portion formed integrally with said flange for compressing the peripheral edge portion of said diaphragm with a constant pressure so that said flange and said base are connected by said bolts in the condition where said diaphragm is compressed onto said base with said constant pressure by said diaphragm retaining portion.

2. A diaphragm valve as set forth in claim 1, including a sensor body including a sealed casing formed with an infiltration membrane in a part, which permits a liquid to pass from outside to inside of said sealed casing, a strong electrolyte filled in said sealed casing, a pair of electrodes arranged within said sealed casing in opposition with each other, said sensor body being provided at a position where said infiltration membrane contacts with the liquid leaking to a backside of said diaphragm, and a detection circuit for detecting a conductive state between said electrodes within said sealed casing.

3. A diaphragm valve as set forth in claim 2, wherein said diaphragm is consisted of a liquid side membrane of fluorine containing resin and a back side membrane of rubber laminated on a back surface of said liquid side membrane, and a leakage announcing conduit is provided in said back side membrane.

4. A diaphragm valve as set forth in claim 1, wherein a retaining surface of said diaphragm retaining portion is located at a position projecting for a predetermined length from an abutting surface of said bracket mounting flange abutting onto said annular base.

5. A diaphragm valve as set forth in claim 1, wherein said diaphragm is circular in shape.

6. A diaphragm valve as set forth in claim 1, wherein said valve operating portion is formed with a cylinder connected to a bracket mounted on the side of said valve body, and a piston rod of said cylinder forms said actuation shaft.

7. A diaphragm valve as set forth in claim 1, wherein said valve operating portion comprises a threaded shaft threadingly engaged with said bracket mounted on the side of said valve body and a handle operated for driving said threaded shaft for rotation, and said threaded shaft serves as said actuation shaft.

8. A diaphragm valve with elements fixing a peripheral edge portion on a liquid side of a diaphragm arranged in opposition to a valve seat within a valve body, on an annular diaphragm mounting seat provided in a predetermined portion of said valve body, and driving an actuation shaft of a valve operating portion connected to a central portion on a back surface of said diaphragm back and forth in an axial direction to abutting and releasing positions of the liquid side of said diaphragm with respect to said valve seat for opening and closing a flow passage, comprising:

said diaphragm comprising a liquid side membrane of fluorine containing resin and a back side membrane of rubber laminated on a back surface of said liquid side membrane;

said liquid side membrane having an annular ridge portion extending along a peripheral edge portion, and an annular projection extending circumferentially at the inner side of said annular ridge portion; and said diaphragm mounting seat having an annular projection on an inside of a peripheral edge thereof and an annular groove extending along an outer periphery of said annular projection for engaging with said annular ridge portion for abutting said annular projection onto said annular projection of said diaphragm mounting seat.

9. A diaphragm valve with elements fixing a peripheral edge portion on a liquid side of a diaphragm arranged in opposition to a valve seat within a valve body, on an annular diaphragm mounting seat provided in a predetermined portion of said valve body, and driving an actuation shaft of a valve operating portion connected to a central portion on a back surface of said diaphragm back and forth in an axial direction to abutting and releasing the liquid side of said diaphragm with respect to said valve seat for opening and closing a flow passage, comprising:

said diaphragm comprising a liquid side membrane of fluorine containing resin and a back side membrane of rubber laminated on a back surface of said liquid side membrane;

said liquid side membrane having an annular ridge portion extending along a peripheral edge portion and an annular projection extending circumferentially at an inner side of said annular ridge portion; and said diaphragm mounting seat having an annular projection inside of a peripheral edge thereof;

an annular base provided to project from a surface of said mounting seat for a predetermined height and connected with a bracket mounting flange on the side of said valve operating portion by bolts;

an annular groove extending along an outer periphery of said annular projection for engaging with said annular ridge portion for abutting said annular projection onto said annular projection of said diaphragm mounting seat; and a diaphragm retaining portion formed integrally with said flange for compressing the peripheral edge portions of said back side membrane and said liquid side membrane of said diaphragm with a constant pressure so that said flange and said base are connected by said bolts in the condition where said diaphragm is compressed onto said base with constant pressure by said diaphragm retaining portion.

10. A diaphragm valve with elements fixing a peripheral edge portion on a liquid side of a diaphragm arranged in opposition to a valve seat within a valve body, and driving an actuation shaft of a valve operating portion connected to a central portion on a back surface of said diaphragm back and forth in an axial direction to abutting and releasing positions of the liquid side of the diaphragm with respect to said valve seat for opening and closing a flow passage, comprising:

a sensor body including a sealed casing formed in a part with an infiltration membrane, which permits a liquid to pass from outside to inside of said sealed casing, a strong electrolyte filled in said sealed casing, a pair of electrodes arranged within said sealed casing in opposition with each other, said sensor body being provided at a position where said infiltration membrane contacts with the liquid leaking to a backside of said diaphragm, and a detection circuit for detecting a conductive state between said electrodes within said sealed casing.

11. A diaphragm valve as set forth in claim 10, wherein said diaphragm is consisted of a liquid side membrane of fluorine containing resin and a back side membrane of rubber laminated on a back surface of said liquid side membrane, and a leakage announcing conduit is provided in said back side membrane.

* * * * *